Nov. 29, 1966     S. G. SÖREDAL     3,288,645
GAS ELECTRODE FOR FUEL CELL, METHOD
OF PRODUCING SAME, AND FUEL CELL
Filed July 19, 1962

United States Patent Office 3,288,645
Patented Nov. 29, 1966

3,288,645
GAS ELECTRODE FOR FUEL CELL, METHOD OF PRODUCING SAME, AND FUEL CELL
Sven Gunnar Söredal, Stockholm, Sweden, assignor to Svenska Ackumulator Aktiebolaget Jungner, Stockholm, Sweden, a company of Sweden
Filed July 19, 1962, Ser. No. 210,924
Claims priority, application Sweden, July 21, 1961, 7,517/61
11 Claims. (Cl. 136—86)

The present invention relates to an arrangement in connection with a gas electrode for such fuel cells in which gases of combustion are formed during operation, including a porous plaque at least one side surface of which is in contact with an electrolyte, and the edge surface or edge surfaces of which are in contact with a gas room or chamber. The invention is mainly characterized in that the electrode is provided with arrangements for the supplying of gas to the center of the electrode, a radially directed gas flow thus developing from the center of the electrode.

The invention further relates to a method of producing an electrode provided with the arrangement according to the invention.

In connection with fuel cells with gas electrodes in the form of a porous plaque with one or both sides in contact with an electrolyte and with its edge or edges in contact with a gas room, one has so far generally arranged inlets and outlets for the gases at or in the proximity of either edges of the electrode. In some cases an inlet only for the gas has been suggested, namely in such cases when all gases are consumed, and the products of combustion are removed some other way than in the form of gases of combustion. In all such cases, however, there will arise problems in connection with the tightening around the edges of the electrodes and the electrolyte. Above all, this is true in connection with high temperature cells in which case it is particularly difficult to arrange the tightening.

The difficulties described will be avoided by means of the arrangement according to the present invention. When applying this arrangement the gases are led to the center of the electrode which may, for instance, be of circular shape, and let out or vented freely at the perimetrical edge of the electrode. By this arrangement it is possible to incapsulate a complete battery of cells in one single housing when it is desired to collect the gases of combustion, and practically all tightening problems will be obviated, in addition to which the work of connecting a complicated system of outlet tubing will be avoided.

Figure 1:
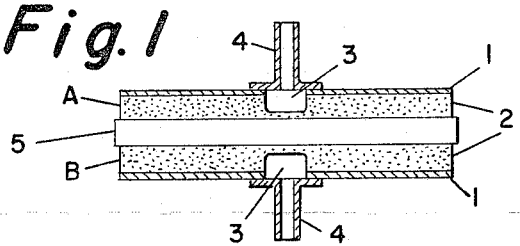
Figure 2:
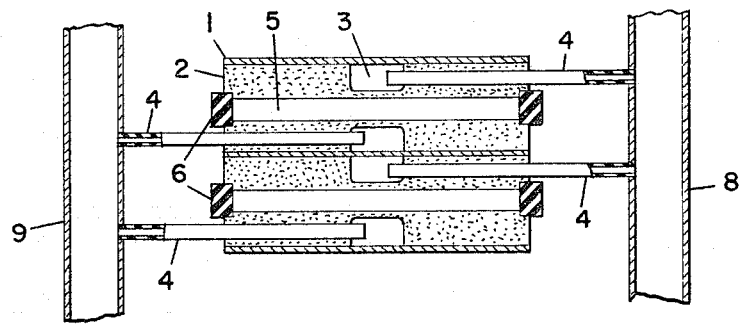
Figure 3:
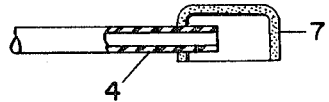
Figure 4:
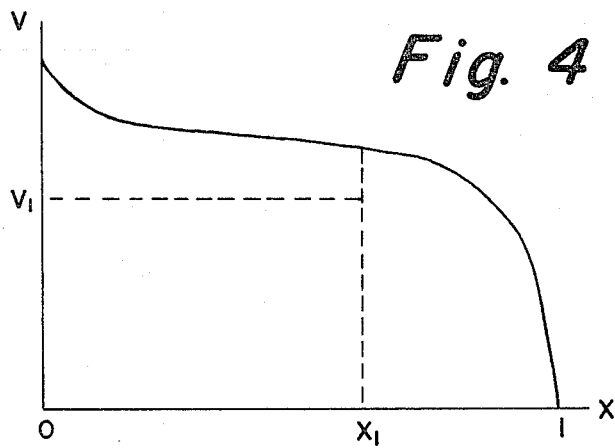

For a more detailed understanding of the invention, reference is made to the accompanying figures of the drawings in which:

FIG. 1 shows the invention applied to one single cell;
FIGURE 2 shows the invention applied to cells in a battery with bi-polar electrodes;
FIG. 3 shows a detail to be utilized in connection with a method of producing electrodes for the arrangement according to FIG. 2; and
FIGURE 4 shows a diagram utilized for the estimation of the electric current density which will be obtained at different gas flowing conditions in the electrodes.

In FIG. 1, A and B designate two electro-chemical electrodes, each consisting of a non-porous wall such as a metal plate 1 onto which a porous gas permeable plaque 2 of conductive material is attached, possibly provided with catalysts necessary. This plaque may consist of sintered metal powder. There is a hole in the center of metal plate 1, and there is a corresponding recess or cavity 3 in the porous gas permeable plaque. A flow passage or tube 4 leads to the little chamber thus obtained through which a gas, a fuel or an oxidant, is supplied. The word oxidant is here used in its widest meaning. An electrolyte layer 5 is provided between the sintered plaques 2, and rests closely against their total surface.

In FIG. 2 numerals 1–5 designate the same details as in FIG. 1, but in addition there is provided a ring 6 of non-conductive material insulation between plaques 2. The electrodes may be provided with a recess corresponding to the ring. Tubes 4 leading to the positive electrodes are connected to a main tube 8 for an oxidant, for instance air, and the tubes leading to the negative electrodes are connected to another main tube 9 for fuel gas. Tubes 8 and 9, or tubes 4, are made of some insulating material, or tubes 4 must be insulated from tubes 8 and 9 respectively by means of interconnection of insulating material. Otherwise the battery will be short-circuited.

When making the electrodes, for instance according to FIG. 2, with a sintered conductive plaque provided with the arrangement described above, one may first attach a tube 4, FIG. 3, for instance by sintering, onto a little bowl or concave device 7, preferably of the same material as the material intended for the porous plaques of the electrodes. The little bowl with its tube is then placed on metal plate 1 and enclosed with the material in the form of powder intended for the porous plaque, and after that the whole is sintered together. Another method of making the chamber 3 is to mold a little lump around one end of tube 4 with the same dimensions as the recess to be, this lump being of a material that is soluble in a solvent, for instance a salt, and which has a higher melting point than the sintering temperature employed. The tube with the lump is placed on metal plate 1, and the electrode material is then added in the form of a powder. The powder is sintered, and after that the lump is removed by means of leaching.

Instead of attaching a tube onto the little bowl 7, and so on, a channel may of course be arranged by some suitable means after the porous plaque has been made, or in connection with its making.

In such cases when the fuel as well as the products of combustion are gaseous, a no load voltage will be obtained the magnitude of which is depending on the degree of combustion. The curve of the idling voltage V as a function of the degree of combustion $x$ has in principle the appearance according to FIG. 4. The degree of combustion is calculated as the relation between the amount of oxygen supplied in a certain case and the amount of oxygen that is needed for a complete combustion. In a cell of this kind it may be assumed that a voltage will be obtained that is equal to the idling voltage minus a constant times the density of the current.

In a cell with radial flow according to the invention it is therefore true when in every point the degree of combustion is $x$ and the voltage is V, that $$V - sR = V_1$$

where $s$ is the density of the current and R the total resistance per surface unit. In this connection V and $s$ are functions of the radius $r$. If the quantity of fuel gas supplied is $m$ gekv/s, the change of $x$ on changing of the radius from $r$ to $r+dr$ is $$mx + \frac{s2\pi r dr}{F} = m\left(x + \frac{dx}{dr}dr\right)$$

$$s = \frac{mF}{2\pi r} \cdot \frac{dx}{dr}$$

Thus, $$V - \frac{mFR}{2\pi r} \cdot \frac{dx}{dr} = V_1$$

$$\pi r^2 = mFR \int_0^x \frac{dx}{V - V_1}$$

When the gas is supplied at one edge of a square electrode with the width $b$ and length co-ordinate $y$, and let out at the opposite edge the following equations will be obtained $$V - sR = V_1$$

$$mx + \frac{sbdy}{F} = m\left(x + \frac{dx}{dy} \cdot dy\right)$$

$$s = \frac{mF}{b} \cdot \frac{dx}{dy}$$

$$V - \frac{mFR}{b} \cdot \frac{dx}{dy} = V_1$$

$$by = mFR \int_0^x \frac{dx}{V - V_1}$$

These calculations show that at a certain degree of combustion, and on supplying a certain quantity of gas, i. e. for a certain current, exactly the same electrode surface is needed at parallel as at radical flow.

When operating batteries according to the present invention with air, the quantity of air should be limited in such a way that practically all oxygen is consumed in the cell. By that means it is avoided that the not completely burnt gases of combustion are burnt, and thus wasted, at the edge of the cell. The quantity of fuel should be measured in such a way that a maximum efficiency is obtained. If the amount of fuel is too small the voltage will be low on account of the gases containing too much oxygen in the form of carbon dioxide and water in the proximity of the periphery of the electrode. If it is too large the fuel will not be economically utilized.

It is suitable to arrange the electrodes in such a way that the porous plaque rests closely against a fixed wall (metal plate 1) on one side and against the electrolyte on the other, the gas being forced to pass through the porous layer.

While a preferred embodiment of this invention has been illustrated, it is to be understood that other modifications thereof may be made within the scope of the appended claims.

What is claimed is:

1. The method of making an electro-chemical electrode assembly comprising:
   forming a relatively thin concave device of powdered metal,
   connecting means including a flow passage to said concave device,
   surrounding both the concave device and the means including a flow passage with powdered metal, and
   sintering the whole together to produce a porous metal electrode assembly.

2. The method of making an electro-chemical electrode assembly according to claim 1 wherein:
   the powdered metal used to form the concave device is of the same material as the powdered metal used to surround the concave device and means including a flow passage,
   the flow passage comprises a hollow tube attached to and extending through to the interior of the concave device, and
   the concave device is positioned with the concavity thereof facing a metal plate prior to being surrounded with powdered metal and sintered.

3. An electro-chemical electrode for disposition in a gas chamber and between an electrolyte and a non-porous wall, comprising:
   a gas permeable plaque formed of a porous conductive material and having two opposed side surfaces for engagement with said electrolyte and in contact with said non-porous wall and a perimetrical edge surface for direct exposure to said gas chamber, and
   means constructed and arranged to supply gas directly to the center of said plaque, gas supplied to the plaque diffusing radially from the center thereof outwardly through the porous conductive material of said plaque and out said exposed perimetrical edge surface thereof.

4. An electrode according to claim 3 wherein said porous plaque includes a carrier.

5. An electro-chemical electrode for disposition in a gas chamber and between an electrolyte and non-porous wall, comprising:
   a gas permeable plaque formed of a porous conductive material and having a pair of opposed side surfaces for engagement with said electrolyte and in contact with said non-porous wall and a perimetrical edge surface for direct exposure to said gas chamber,
   a cavity disposed within the center of said plaque, and
   at least one gas permeable flow passage extending through said perimetrical surface on said plaque and connected to said cavity, gas supplied to said cavity through the flow passage diffusing radially from the cavity outwardly through the porous conductive material of said plaque and out said exposed perimetrical edge surface thereof.

6. An electro-chemical electrode for disposition in a gas chamber and between an electrolyte and a non-porous wall, comprising:
   a gas permeable plaque formed of a porous conductive material and having a pair of opposed side surfaces for engagement with said electrolyte and in contact with said non-porous wall and a perimetrical edge surface for direct exposure to said gas chamber,
   a cavity disposed within the center of said plaque, and
   at least one gas impermeable flow passage extending through one of said opposed side surfaces of said plaque and connected to said cavity, gas supplied to said cavity through the flow passage diffusing radially from the cavity outwardly through the porous conductive material of said plaque and out said exposed perimetrical edge surface thereof.

7. In a fuel cell having at least one pair of electrodes, the improvement wherein each of said electrodes comprises a porous plaque of conductive material having a pair of opposed side surfaces with a common edge surface, an electrolyte layer disposed between said porous plaques in contact with one of said side surfaces of each of said porous plaques, each said edge surface being in contact with a gas room, means for supplying gas to the center of each of said electrodes through one of said surfaces thereof, and non-porous wall structure engaging the other side surface of each of said porous plaques whereby the gas is forced to pass through the porous plaques thus developing a radially directed gas flow from the center of each electrode toward the edge surface thereof and the gas room in contact therewith.

8. A gas electrode for fuel cells comprising a porous plaque of conductive material having a pair of side surfaces with a common edge surface, an electrolyte layer in contact with one of said side surfaces of said porous plaque, a non-porous wall in contact with the other side surface of said porous plaque, said edge surface being in contact with a gas room, and means for supplying gas to the center of said electrode through one of said surfaces thereof whereby the gas is forced to pass through the porous plaque thus developing a radially directed gas flow from the center of the electrode towards the edge surface thereof and the gas room in contact therewith.

9. A gas electrode according to claim 8 wherein said non-porous wall comprises a metal plate onto which said porous plaque is attached.

10. A gas electrode according to claim 8 wherein said means for supplying gas to the center of said electrode extends through said edge surface of said porous plaque.

11. A gas electrode according to claim 8 wherein said means for supplying gas to the center of said electrode extends through said non-porous wall and communicates with the center of said side surface in contact therewith.

References Cited by the Examiner

UNITED STATES PATENTS

| | | | |
|---|---|---|---|
| 2,901,523 | 8/1959 | Justi et al. | 136—86 |
| 2,914,596 | 11/1959 | Gorin et al. | 136—86 |
| 2,980,749 | 4/1961 | Broers | 136—86 |
| 3,035,998 | 5/1962 | Sommer et al. | 136—120 X |
| 3,101,285 | 8/1963 | Tantram et al. | 136—86 |

FOREIGN PATENTS

| | | |
|---|---|---|
| 227,564 | 10/1957 | Australia. |
| 2,411 | 2/1888 | Great Britain. |
| 912,106 | 6/1954 | Germany. |

WINSTON A. DOUGLAS, *Primary Examiner.*

JOHN R. SPECK, H. FEELEY, A. B. CURTIS,
*Assistant Examiners.*